(12) United States Patent
Yoshida et al.

(10) Patent No.: US 10,236,096 B2
(45) Date of Patent: Mar. 19, 2019

(54) WIRE HARNESS AND MANUFACTURING METHOD OF WIRE HARNESS

(71) Applicant: YAZAKI CORPORATION, Tokyo (JP)

(72) Inventors: Hiroyuki Yoshida, Shizuoka (JP); Hideomi Adachi, Shizuoka (JP); Takeshi Ogue, Shizuoka (JP); Masahide Tsuru, Shizuoka (JP); Kenta Yanazawa, Shizuoka (JP); Toshihiro Nagashima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/826,518

(22) Filed: Nov. 29, 2017

(65) Prior Publication Data
US 2018/0151269 A1    May 31, 2018

(30) Foreign Application Priority Data

Nov. 30, 2016  (JP) ................................. 2016-232683

(51) Int. Cl.
*H01B 7/00* (2006.01)
*H01B 7/02* (2006.01)
(Continued)

(52) U.S. Cl.
CPC ......... *H01B 7/0045* (2013.01); *H01B 7/0275* (2013.01); *H01B 13/01209* (2013.01);
(Continued)

(58) Field of Classification Search
CPC ................ H01B 7/0045; H01B 7/0275; H01B 13/01209; H01B 13/14
(Continued)

(56) References Cited

U.S. PATENT DOCUMENTS

| 2011/0018210 A1* | 1/2011 | Beele ........................ F16L 5/10 |
|---|---|---|
| | | 277/606 |
| 2015/0210230 A1 | 7/2015 | Adachi et al. |

(Continued)

FOREIGN PATENT DOCUMENTS

| JP | 50-19755 B1 | 7/1975 |
|---|---|---|
| JP | 2014-93799 A | 5/2014 |

(Continued)

OTHER PUBLICATIONS

Japanese Office Action for the related Japanese Patent Application No. 2016-232683 dated Oct. 16, 2018.

*Primary Examiner* — Timothy J Thompson
*Assistant Examiner* — Charles Pizzuto
(74) *Attorney, Agent, or Firm* — Kenealy Vaidya LLP

(57) ABSTRACT

A wire harness including one or more electrically conductive paths and a resin molded product having a tubular shape which accommodates and protects the one or more electrically conductive paths. The resin molded product includes a first part having clearances along a circumferential direction between an inner surface of the resin molded product and outer surfaces of the one or more electrically conductive paths and a second part having substantially no clearance between the inner surface of the resin molded product and an outer surface of one of the one or more electrically conductive paths in an area along the circumferential directions.

3 Claims, 4 Drawing Sheets

(51) Int. Cl.
  *H01B 13/14* (2006.01)
  *H01B 13/012* (2006.01)
  *H02G 3/04* (2006.01)

(52) U.S. Cl.
  CPC ....... *H01B 13/01263* (2013.01); *H01B 13/14* (2013.01); *H02G 3/0468* (2013.01)

(58) Field of Classification Search
  USPC .................................................. 174/72 A
  See application file for complete search history.

(56) References Cited

U.S. PATENT DOCUMENTS

2016/0180987 A1* 6/2016 Manabe ............... H01B 13/143
                                                        264/171.16
2016/0322796 A1   11/2016 Sugimoto et al.

FOREIGN PATENT DOCUMENTS

| JP | 2015-163007 A |   | 9/2015 |
|----|---------------|---|--------|
| JP | 2015231265    | * | 12/2015 |
| JP | 2015231565    | * | 12/2015 |

* cited by examiner

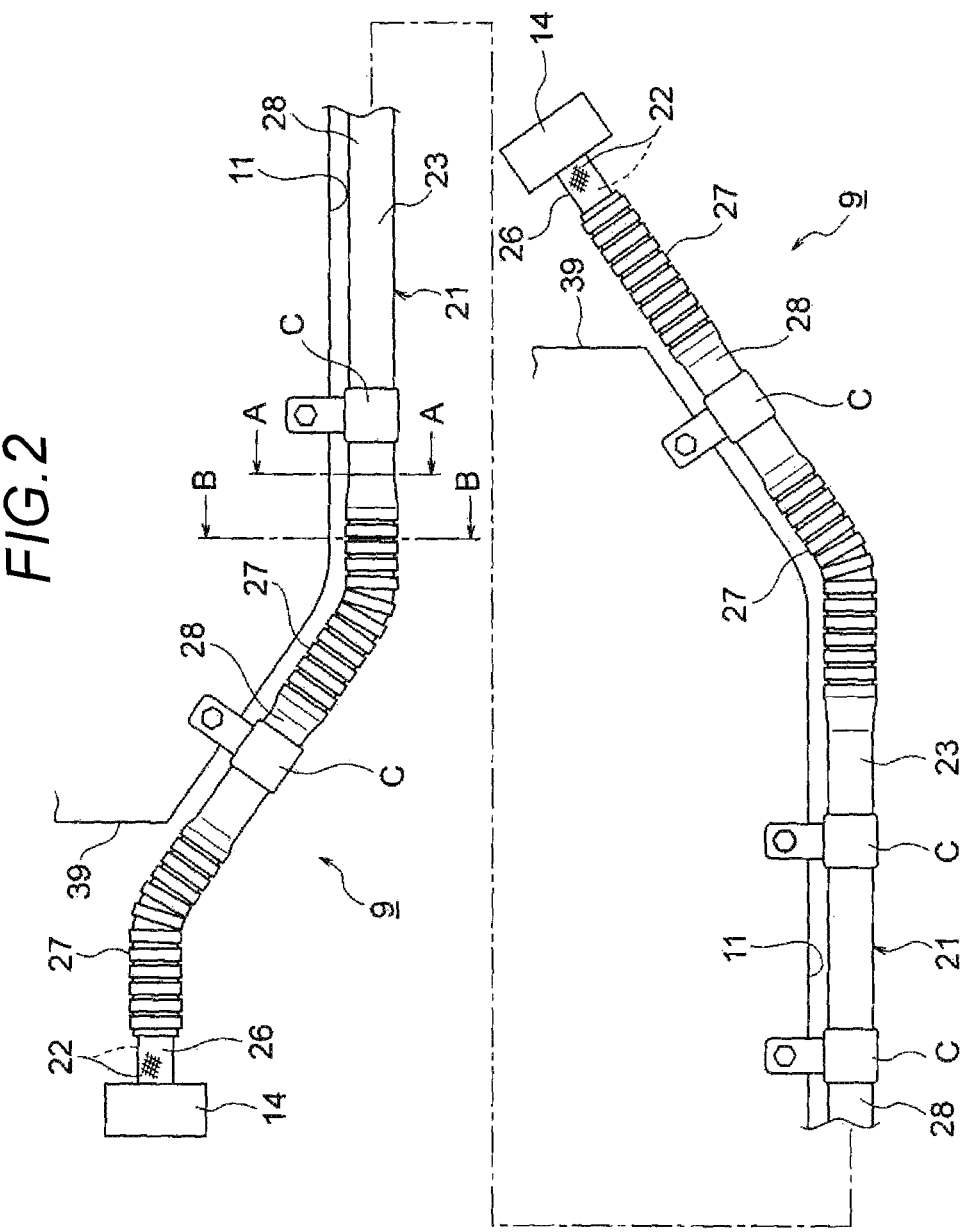

WIRE HARNESS AND MANUFACTURING METHOD OF WIRE HARNESS

CROSS REFERENCE TO RELATED APPLICATIONS

This application claims priority from Japanese Patent Application No. 2016-232683 filed on Nov. 30, 2016, the entire contents of which are incorporated herein by reference.

BACKGROUND OF THE INVENTION

<Field of the Invention>

The present invention relates to a wire harness including one or more electrically conductive paths and a resin molded product which accommodates therein and protects the electrically conductive paths and a manufacturing method of the wire harness.

<Description of Related Art>

In order to electrically connect devices mounted on a motor vehicle, the wire harness is used. The wire harness includes a sheath member made of a resin and having a tubular shape and one or more electrically conductive paths which are accommodated in the sheath member. For instance, in a wire harness disclosed in below-described Patent Literature 1, the wire harness is arranged so as to pass through an under-floor of a motor vehicle. In the wire harness, a part corresponding to the under-floor of the vehicle is arranged straightly. Such a wire harness is formed to be long.

[Patent Literature 1] JP-A-2014-93799

According to a related art, since a wire harness is long, a sheath member and electrically conductive paths are also long. Accordingly, when the sheath member is configured in a form having no slit (it is not split), below-described problems arise. Namely, when the sheath member has no slit and is long, the electrically conductive paths are manufactured so as to be inserted from one end to the other end of the sheath member. Therefore, the sheath member needs to ensure an internal space with a size necessary for inserting the electrically conductive paths. Accordingly, a problem arises that the size of the sheath member is large. In order to insert the electrically conductive paths, when a guide cap is attached to an end of the electrically conductive path, a thickness of the cap needs to be considered, so that the size of the sheath member is more enlarged. When the size of the sheath member is enlarged, it is to be understood that the large size of the sheath member gives an influence to a weight or cost.

In addition thereto, when the internal space with the size necessary for inserting the electrically conductive paths is ensured, an opening space formed between an inner surface of the sheath member and an outer surface of the electrically conductive path becomes large. Accordingly, when the electrically conductive path is greatly vibrated due to a vibration during a driving of the motor vehicle, a problem also arises that a coating of the electrically conductive path (when the coating of the electrically conductive path has a shield function, a braided part or a metal foil in an outer side of the electrically conductive path) strongly strikes an inner surface of a tube of the sheath member and is broken.

SUMMARY

One or more embodiments provide a wire harness and a manufacturing method of a wire harness in which a sheath member can be made to be compact, a weight can be reduced and a cost can be lowered, and further, a vibration of an electrically conductive path can be suppressed in a sheath member so that the electrically conductive path may be prevented from being broken.

In accordance with one or more embodiments, a wire harness includes one or more electrically conductive paths and a resin molded product having a tubular shape which accommodates and protects the one or more electrically conductive paths. The resin molded product includes a first part having clearances along a circumferential direction in substantially whole circumference between an inner surface of the resin molded product and outer surfaces of the one or more electrically conductive paths and a second part having substantially no clearance between the inner surface of the resin molded product and an outer surface of one of the one or more electrically conductive paths in an area along the circumferential direction.

In accordance with one or more embodiments, a manufacturing method of a wire harness including one or more electrically conductive paths and a resin molded product having a tubular shape which accommodates and protects the one or more electrically conductive paths, the manufacturing method includes extruding straight an extruded resin material having an internal space to a die from a resin extruding machine and supplying straight the one ore more electrically conductive paths toward the internal space together with the extrusion and forming an outer surface of the extruded resin material to an outer configuration of the resin molded product and aligning an inner surface of the extruded resin material corresponding to outer surfaces of the one or more electrically conductive paths.

In the manufacturing method of the wire harness of one or more embodiments, a manufacturing method of a wire harness including one or more electrically conductive paths and a resin molded product having a tubular shape to accommodate and protect the electrically conductive paths, the manufacturing method includes passing the electrically conductive path through a resin extruding machine and supplying straight the electrically conductive path to a die, extruding straight from the resin extruding machine an extruded resin material having an internal space toward the die in an outer surface side of the electrically conductive path together with the supply, forming an outer surface of the extruded resin material to an outer configuration of the resin molded product in the die and aligning an inner surface of the extruded resin material corresponding to the outer surface of the electrically conductive path.

According to one or more embodiments, a resin molded product forming a wire harness is configured in such a form that is divided to a part under a state in which the inner surface comes into contact with the outer surface of the electrically conductive path with a clearance along a circumferential direction and a part under a state in which the inner surface comes into contact with the outer surface of the electrically conductive path substantially without a clearance. Accordingly, in the part provided with the clearance, a bending function of the wire harness can be effectively ensured. On the other hand, in the part which comes into contact with the outer surface of the electrically conductive path substantially without the clearance, since the wire harness is compact, a miniaturization can be achieved, a weight can be reduced and a cost can be lowered effectively. In addition thereto, in the part which comes into contact with the outer surface of the electrically conductive path substantially without the clearance, a vibration of the electrically conductive path can be effectively suppressed in the resin molded product to prevent the damage of the electrically conductive path.

According to one or more embodiments, in a manufacturing method in which an extruded resin material is extruded and an electrically conductive path is supplied to an internal space of the extruded resin material together with the extrusion. Further, according to the manufacturing method, in the die, the outer surface of the extruded resin material is formed to the outer configuration of the resin molded product and the inner surface of the extruded resin material is allowed to meet a position corresponding to the outer surface of the electrically conductive path. Accordingly, the electrically conductive path does not need to be inserted afterward as in the usual example. Thus, a minimum internal space may be sufficiently ensured as necessary as possible. As a result, the resin molded product which accommodates therein and protects the electrically conductive path can be made to be compact. Therefore, when the manufacturing method of the present invention is used, the resin molded product can be miniaturized, the weight can be reduced, the cost can be lowered and an operation can be simplified effectively. Further, the vibration of the electrically conductive path can be also effectively suppressed in the resin molded product to prevent the damage of the electrically conductive path.

When the resin molded product can be made to be compact, it is to be understood that a member (for instance, a protector or the like) which is attached to the resin molded product afterward can be made to be compact.

Additionally, according to one or more embodiments, when an inner surface of an extruded resin material (a resin molded product) comes into contact with an outer surface of an electrically conductive path without a clearance "no clearance", it is possible for the wire harness to be hardly bent. Further, when the clearance is adjusted to a "minimum clearance as necessary as possible", the wire harness may be easily bent. Accordingly, in the manufacturing method of the present invention, a difficulty concerning a bending of the wire harness can be suitably and advantageously adjusted.

BRIEF DESCRIPTION OF THE DRAWINGS

FIG. 1A is a schematic diagram showing an arranged state of a high voltage wire harness. FIG. 1B is a schematic diagram showing an arranged state of a low voltage wire harness different from that of FIG. 1A.

FIG. 2 is a diagram showing a path arranged state and a structure of the wire harness shown in FIG. 1A.

FIG. 3A is a sectional view taken along a line A-A. FIG. 3B is a sectional view taken along a line B-B.

MODE FOR CARRYING OUT THE INVENTION

In a wire harness, a sheath member as the resin molded product is configured to such a form that is divided to a part under a state in which an inner surface of the sheath member comes into contact with an outer surface of an electrically conductive path with a clearance along a circumferential direction and to a part under a state in which an inner surface of the sheath member comes into contact with an outer surface of an electrically conductive path substantially without a clearance. Further, a manufacturing method of a wire harness is a manufacturing method in which an extruded resin material is extruded and one or more electrically conductive paths are supplied to an internal space of the extruded resin material together with the extrusion of the extruded resin material. Further, according to the manufacturing method, in a die, an outer surface of the extruded resin material is formed to an outer configuration of the resin molded product and an inner surface of the extruded resin material is allowed to meet a position corresponding to an outer surface of the electrically conductive path.

[Exemplary Embodiment]

Figure 1A:
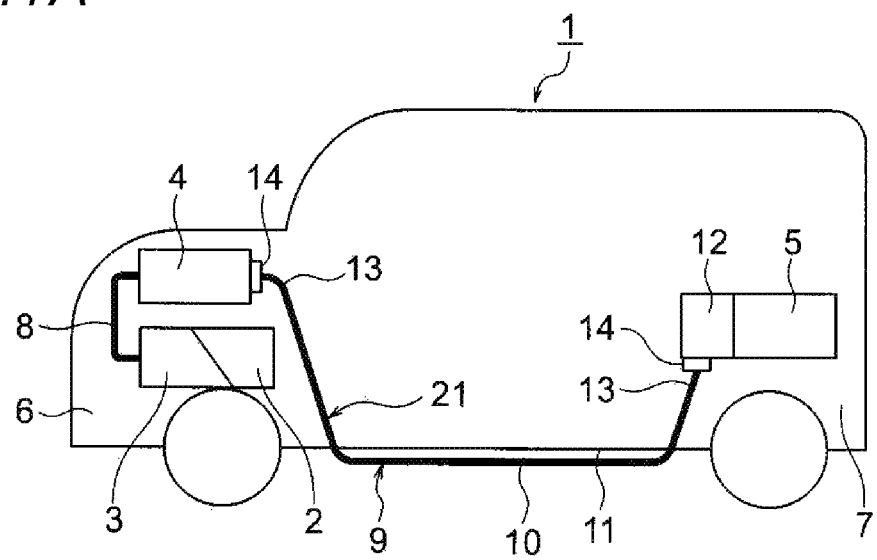
FIGS. 1A and 1B are diagrams showing a wire harness manufactured by a manufacturing method of the present invention.
Figure 1B:
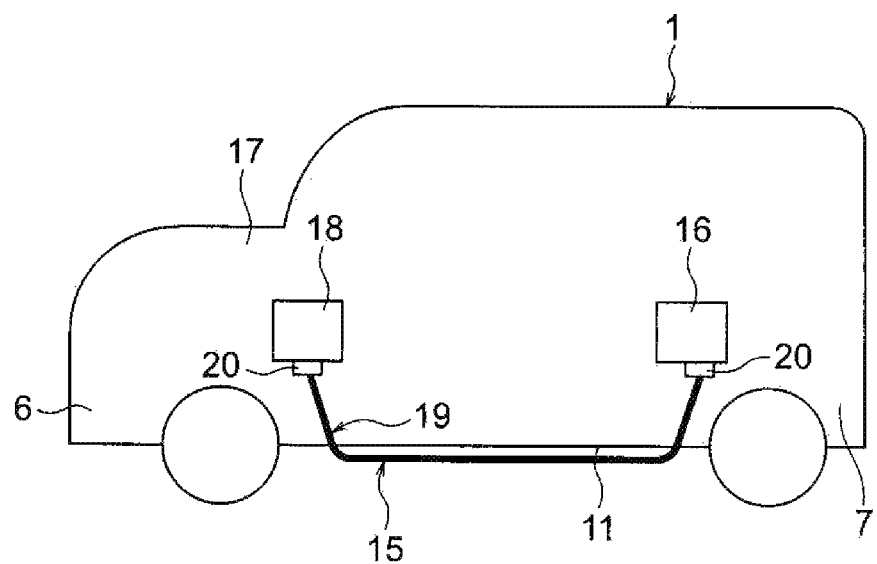
Figure 3A:
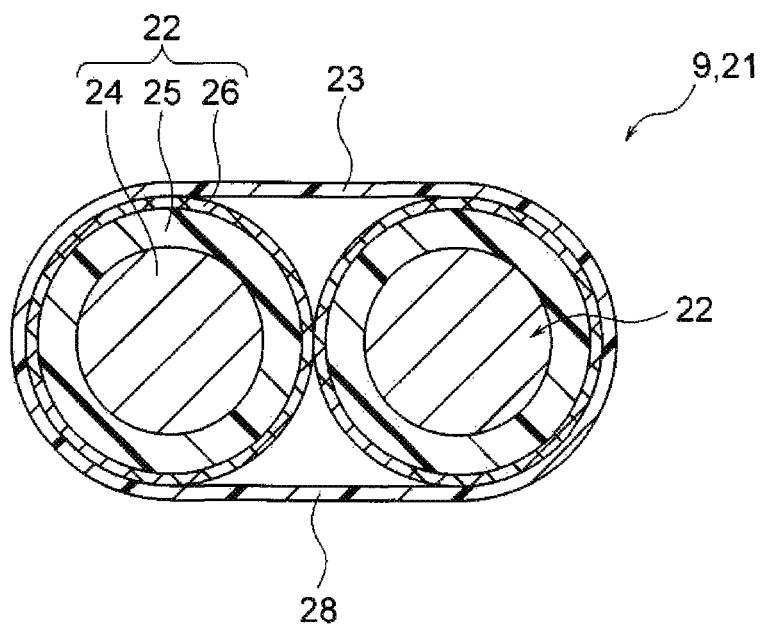
FIGS. 3A and 3B are sectional views of the wire harness shown in FIG. 2.
Figure 3B:
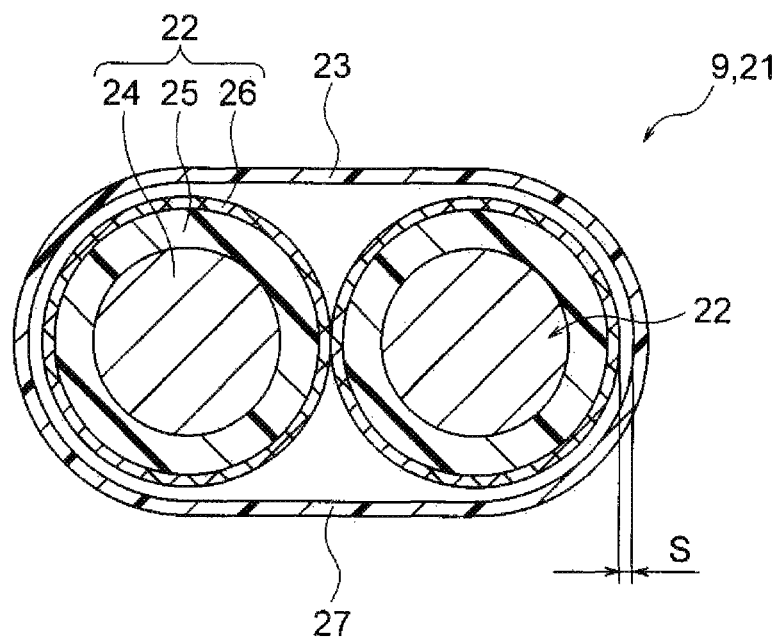
Figure 4:
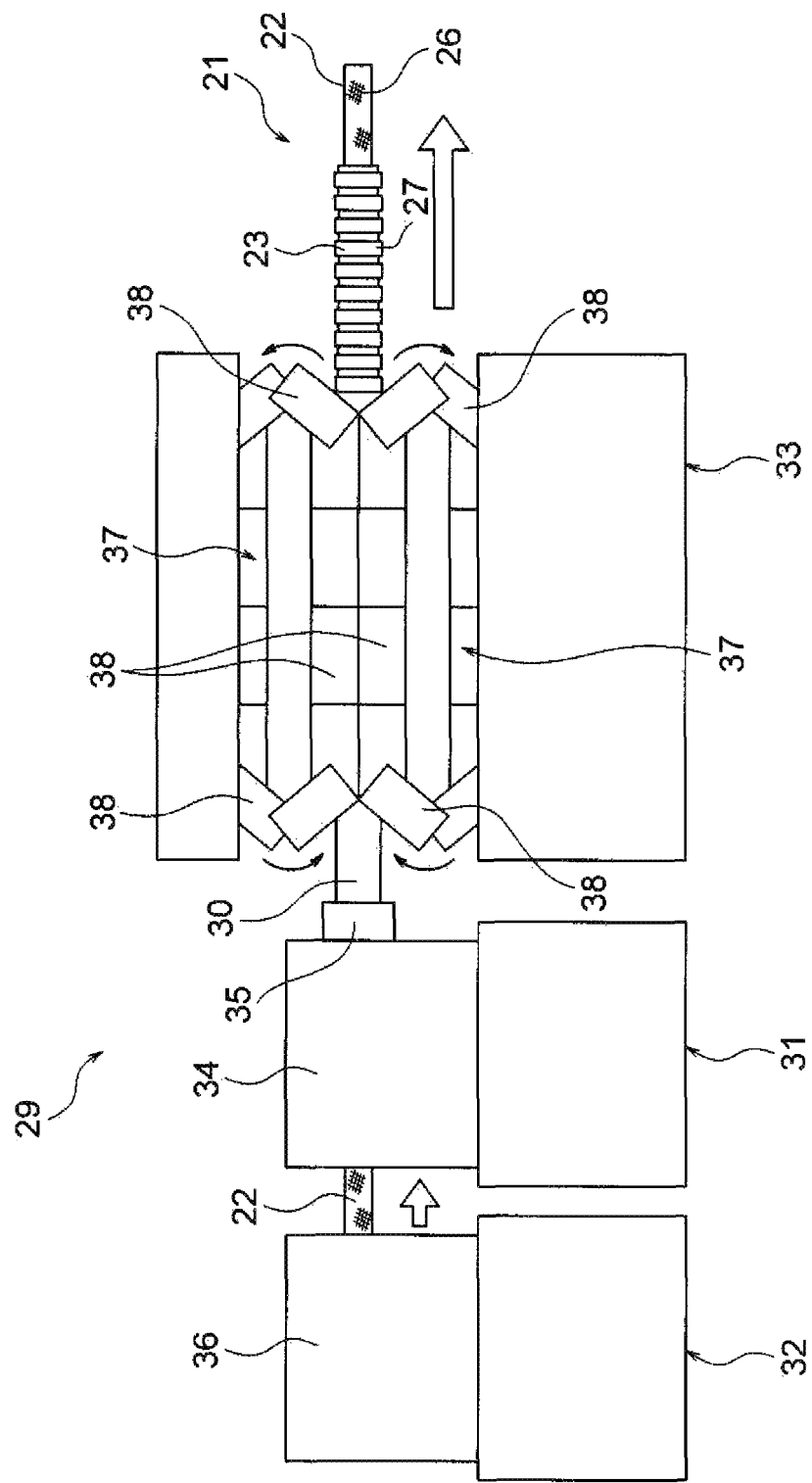
FIG. 4 concerns the manufacturing method of the present invention and is a schematic view showing a manufacturing device to which the method is applied.

Now, by referring to the drawings, a first exemplary embodiment of the present invention will be described below. FIGS. 1A and 1B are diagrams showing a wire harness manufactured by a manufacturing method of the present invention. FIG. 1A is a schematic diagram showing an arranged state of a high voltage wire harness. FIG. 1B is a schematic diagram showing an arranged state of a low voltage wire harness different from that of FIG. 1A. FIG. 2 is a diagram showing a path arranged state and a structure of the wire harness shown in FIG. 1A. FIG. 3 is a sectional view of the wire harness shown in FIG. 2. FIG. 3A is a sectional view taken along a line A-A. FIG. 3B is a sectional view taken along a line B-B. FIG. 4 concerns the manufacturing method of the present invention and is a schematic view showing a manufacturing device to which the method is applied.

In the present exemplary embodiment, the present invention is used for a wire harness arranged in a hybrid motor vehicle (an electric vehicle or an ordinary motor vehicle driven by an engine may be adopted).

<Structure of Hybrid Motor Vehicle 1>

In FIG. 1A, reference numeral 1 designates a hybrid motor vehicle 1. The hybrid motor vehicle 1 is a vehicle driven by mixing two powers of an engine 2 and a motor unit 3. To the motor unit 3, an electric power from a battery 5 (a battery pack) is supplied through an inverter unit 4. The engine 2, the motor unit 3 and the inverter unit 4 are mounted in an engine room 6 in a position where front wheels are provided in the present exemplary embodiment. Further, the battery 5 is mounted on a rear part 7 of the motor vehicle where rear wheels are provided. (the battery 5 may be mounted in an interior of the motor vehicle located in a rear part of the engine room 6).

The motor unit 3 is connected to the inverter unit 4 by a high voltage wire harness 8 (a motor cable for a high voltage). Further, the battery 5 is connected to the inverter unit 4 by a high voltage wire harness 9. The wire harness 9 has its intermediate part 10 arranged in a vehicle under-floor 11 in the vehicle (in a vehicle body). Further, the intermediate part 10 is arranged substantially in parallel along the under-floor 11 of the vehicle. The under-floor 11 of the vehicle is a known body (the vehicle body) and what is called a panel member and has a through hole formed in a prescribed position. Through the through hole, the wire harness 9 is water-tightly inserted.

The wire harness 9 is connected to the battery 5 through a junction block 12 provided in the battery 5. To the junction block 12, an external connection unit such as a shield connector 14 provided in a harness terminal 13 in a rear end side of the wire harness 9 is electrically connected. Further, the wire harness 9 is electrically connected to the inverter unit 4 through an external connection unit such as a shield connector 14 provided in a harness terminal 13 in a front end side.

The motor unit 3 includes a motor and a generator. Further, the inverter unit 4 includes an inverter and a converter in its structure. The motor unit 3 is formed as a motor assembly including a shield case. Further, the inverter unit 4 is also formed as an inverter assembly including a shield case. The battery 5 is an Ni—MH type or an Li-ion type and formed as a module. For instance, a storage battery such as a capacitor may be used. It is to be understood that the battery 5 is not especially limited as long as the battery 5 can be used for the hybrid motor vehicle 1 or the electric vehicle.

In FIG. 1B, reference numeral 15 designates a wire harness. The wire harness 15 is a wire harness for a low voltage and provided to electrically connect a low voltage battery 16 in a rear part 7 of a vehicle in a hybrid motor vehicle 1 to an auxiliary device 18 (a device) mounted on a front part 17 of the motor vehicle. The wire harness 15 is arranged through an under-floor 11 of the vehicle (showing one example, so that the wire harness may be arranged passing through a vehicle interior side) like the wire harness 9 shown in FIG. 1A. Reference numeral 19 in the wire harness 15 designates a harness main body. Further, reference numeral 20 designates a connector.

As shown ii FIGS. 1A and 1B, in the hybrid motor vehicle 1, the high voltage wire harnesses 8 and 9 and the low voltage wire harness 15 are arranged. In the present invention, any of the wire harnesses may be applied. However, as a representative example, the high voltage wire harness 9 will be described below as an example. Initially, a composition and a structure of the wire harness 9 will be described below.

<Structure of Wire Harness 9>

In FIG. 1A and FIG. 2, the long wire harness 9 arranged through the under-floor 11 of the vehicle includes a harness main body 21 and the shield connectors 14 (the external connection units) provided respectively in both the terminals (the harness terminals 13) of the harness main body 21. Further, the wire harness 9 includes clamps C for arranging the harness itself in prescribed positions and water stop members (for instance, grommets or the like) not shown in the drawing.

<Structure of Harness Main Body 21>

In FIG. 2 and FIGS. 3A and 3B, the harness main body 21 includes two long electrically conductive paths 22 and a sheath member 23 (a resin molded product) which accommodates and protects the two electrically conductive paths 22. The number of the electrically conductive paths shows one example and may be one or three arranged side by side.

<Electrically Conductive Path 22>

In FIG. 2 and FIGS. 3A and 3B, the electrically conductive path 22 includes an electrically conductive conductor 24, an insulating insulator 25 with which the conductor 24 is coated and a braided part 26 (a shield member) which exhibits a shield function. Namely, as the electrically conductive path 22, the electrically conductive path having no sheath is used (as one example). Since the electrically conductive path 22 has no sheath, it is to be understood that the electrically conductive path is the lighter (since the electrically conductive path 22 is long, it is to be understood that the electrically conductive path 22 can be made to be greatly lighter than the usual example).

<Conductor 24>

In FIGS. 3A and 3B, the conductor 24 is formed with copper or copper alloy, or aluminum or aluminum alloy so as to have a circular form in section. The conductor 24 may have either a conductor structure formed by twisting element wires or a rod shaped conductor structure with a circular form (a round form) in section (for instance, a conductor structure having a round single core, and in this case, the electrically conductive path itself has a rod form). In the conductor 24 as described above, the insulator 25 made of an insulating resin material is extruded and molded on an outer surface thereof.

<Insulator 25>

In FIGS. 3A and 3B, the insulator 25 is extruded and molded on an outer peripheral surface of the conductor 24 by using a thermoplastic resin material. The insulator 25 is formed as a coating with a circular form in section. The insulator 25 is formed so as to have a prescribed thickness. As the above-described thermoplastic resin, various kinds of known resins may be used. For instance, resin materials are suitably selected from polymer materials such as a polyvinyl chloride resin, a polyethylene resin, a polypropylene resin.

In FIGS. 3A and 3B, the braided part 26 is provided as an outermost layer of the electrically conductive path 22. Such a braided part 26 is formed in a tubular shape by knitting extra fine element wires having an electric conductivity. Further, the braided part 26 is formed with such a configuration and size as to cover an entire part of an outer peripheral surface from one end to the other end of the insulator 25. Not only the braided part 26, but also a metal foil may be used as a shield member.

<Sheath Member 23>

In FIG. 2 and FIGS. 3A and 3B, the sheath member 23 is formed in one straight tubular configuration by molding an insulating resin (straight before it is used). Further, the sheath member 23 is configured in a form whose body is not split (In other words, it is configured in the form having no slit (configured in the form which is not a split tube)). Further, the sheath member 23 is configured in an elliptic form in section so as to meet a transversely arranged form of the two electrically conductive paths 22 (When the number of the electrically conductive paths 22 is three, the sheath member 23 is configured in an elliptic form in section which is longer transversely. Further, when the number of the electrically conductive paths is one, the sheath member 23 is configured in a shape having a circular form in section).

Such a sheath member 23 includes a flexible tube parts 27 having flexibility and a straight tube part 28 as a part which arranges straightly the electrically conductive path 22 (This example merely shows one example, and, for instance, an entire part of the sheath member 23 may be formed with the flexible tube part 27). A plurality of flexible tube parts 27 and a plurality of straight tube parts 28 are formed in an axial direction of the tube. Further, the flexible tube parts 27 and the straight tube parts 28 are alternately arranged.

<Flexible Tube Part 27>

In FIG. 2 and FIGS. 3A and 3B, the flexible tube parts 27 are arranged so as to meet a vehicle attaching form (a form to which the wire harness is attached. A form of a below-described object 39 to which the wire harness is attached). Further, the flexible tube parts 27 are configured with such lengths as to meet the vehicle attaching form. The lengths of the flexible tube parts 27 are not fixed and respectively formed to necessary lengths so as to meet the vehicle attaching forms. The above-described flexible tube parts 27 are formed so as to be bent respectively at desired angles depending on a packed state of the wire harness 9, during a transportation of the wire harness 9 and during an arrangement of a path to the vehicle. Namely, the flexible tube parts 27 can be properly bent to have a bending form and returned to an original straight state (a state during the molding of the resin). The flexible tube parts of the present exemplary embodiment are formed in configurations of bellows tubes having bellows recessed parts and bellows protruding parts (This merely shows one example).

<Straight Tube Part 28>

In FIG. 2 and FIGS. 3A and 3B, the straight tube part 28 is formed as a part which does not have such flexibility as in the flexible tube part 27. Further, the straight tube part 28 is also formed as a part which is not bent under a packed state, during its transportation and during an arrangement of a path (a part which is not bent means a part which is not positively provided with flexibility). The straight tube part 28 is configured in a long straight tubular shape. An outer peripheral surface of such a straight tube part 28 is configured in the form having no irregularities (This merely shows one example).

The straight tube part 28 is formed in a part more rigid than the flexible tube part 27. The straight tube part 28 is formed in such a position or with such a length as to meet the vehicle attaching form. The longest straight tube part 28 of the plurality of straight tube parts is formed as apart arranged in the under-floor 11 of the vehicle in the present exemplary embodiment.

<Features of Sheath Member 23>

In FIG. 2 and FIGS. 3A and 3B, the longest straight tube part 28 arranged in the under-floor 11 of the vehicle is formed with a resin in such a way that its inner surface comes into contact with the outer surface (the braided part 26) of the electrically conductive path 22 without a clearance "no clearance" (see FIG. 3A). Further, although it is not especially limited, the flexible tube part 27 or the short straight tube part 28 located in both sides of the longest straight tube part 28 is formed with a resin in such a way that its inner surface comes into contact with the outer surfaces (the braided parts 26) of the two electrically conductive paths 22 with a "minimum clearance S as necessary as possible" (see FIG. 3B). Since the longest straight tube part 28 is provided in such a way that the inner surface comes into contact with the outer surfaces of the two electrically conductive paths 22 without a clearance "no clearance", when the part of this range is viewed as the wire harness 9, the part is formed in a solid part. In other words, the part of the wire harness 9 is formed in a part having a high rigidity or a part which is hardly bent (a part which is made to be hardly bent). When the part arranged in the under-floor 11 of the vehicle has the high rigidity, it is to be understood that a working property in arrangement in this part is improved. The above-described "minimum clearance S as necessary as possible" means such a clearance as to ensure a bending for a space required for bending or a little space to provide a slightly extra length in, for instance, the electrically conductive path 22 for bending. In the present exemplary embodiment, parts of a prescribed range of the wire harness 9 (parts corresponding to both the sides of the longest straight tube part 28) are formed in parts which are easily bent.

In the present exemplary embodiment, the short straight tube part 28 corresponds to "a part having no clearance in an area along a circumference direction". However, the present invention is not limited, and the short straight tube part 28 may correspond to "a part having substantially no clearance". "having substantially no clearance" means the above-described "no clearance". "Substantially" is daringly added in order to permit below-described cases, for instance, an unexpected clearance is formed in a part of a circumferential direction or a clearance is inevitably generated in view of structure. "With a clearance" means the above-described "minimum clearance S as necessary as possible".

<Manufacture of Wire Harness 9 And Manufacturing Device 29 Used for Manufacturing>

In the above-described composition and structure, when the wire harness 9 is manufactured, the harness main body 21 is manufactured by using the manufacturing method of the present invention. Now, by referring to FIG. 4, the manufacture of the harness main body 21 will be described, and then, the manufacture of an entire part will be described below.

In FIG. 4, reference numeral 29 designates a manufacturing device. The manufacturing device 29 is a device that extrudes an extruded resin material 30 which becomes the sheath member 23 (see FIG. 2 and FIGS. 3A and 3B) after molding and supplies the two electrically conductive paths 22 to an internal space of the extruded resin material 30 together with the extrusion. Further, in a below-described die 38 of the manufacturing device 29, an outer surface of the extruded resin material 30 is formed to an outer configuration of the sheath member 23 and an inner surface of the extruded resin material 30 is located in such a position as to meet the outer surface of the electrically conductive path 22 (see FIGS. 3A and 3B "An inner surface of the extruded resin material is located in such a position where "no clearance" or "minimum clearance S as necessary as possible" is formed). The above-described manufacturing device 29 includes a resin extruding machine 31, an electrically conductive path supply machine 32 arranged in an upstream side of the resin extruding machine 31, a molding part 33 arranged in a downstream side of the resin extruding machine 31 and a cooling part not shown in the drawing which is arranged in a downstream side of the molding part 33.

The resin extruding machine 31 includes a hopper as a part for feeding a resin material, which is not shown in the drawing, an extruding machine main body 34 to which the hopper is continuous and a die 35 protruding form an end part of the extruding machine main body 34. The resin molding machine 31 is formed so as to extrude the extruded resin material 30 in a tubular shape elliptic in section toward the molding part 33 from the die 35. The electrically conductive path supply machine 32 is provided with a supply machine main body 36 which supplies the two electrically conductive paths 22 arranged transversely toward the resin extruding machine 31. The supply machine main body 36 is formed so as to supply the two electrically conductive paths 22 to the internal space of the extruded resin material 30. The molding part 33 is formed so as to mold a resin straight from an inlet to an outlet. Further, the molding part 33 has one pair of molding structure parts 37. The one pair of molding structure parts 37 is formed so as to mold the extruded resin material 30 in a prescribed configuration. Specifically, the one pair of molding structure parts 37 are formed in such a way that the extruded resin material 30 which is extruded from the extruding machine main body 34 and has the two electrically conductive paths 22 arranged transversely in the internal space may be formed in the prescribed configuration by a plurality of block shaped dies 38. The one pair of molding structure parts 37 respectively have two pulleys, an endless belt wound on the two pulleys, the plurality of dies 38 provided on the endless belt and a suction mechanism (or an air blower mechanism) which attracts the outer surface of the extruded resin material 30 to cavities of the dies 38. The one pair of molding structure parts 37 is formed so that the inner surface of the extruded resin material 30 may be located in such a position as to meet the outer surface of the electrically conductive path 22 "a position where "no clearance" or "minimum clearance S as necessary as possible" is formed) in accordance with an operation of the suction mechanism not shown in the drawing. The above-described structure of the manufacturing device 29 merely shows one example.

In FIG. 2, the wire harness 9 is manufactured by attaching the clamps C or the grommets, boots or the like to prescribed positions on the outer surface of the sheath member 23. Further, the wire harness 9 is manufactured by providing the shield connectors 14 to the terminal parts of the electrically conductive path 22.

<Arrangement of Path of Wire Harness 9>

After the wire harness 9 is manufactured as described above, the wire harness is bent by folding the prescribed flexible tube parts 27. Thus, the wire harness 9 is completely packed. The packed wire harness 9 is compact and transported to a vehicle attaching spot under such a compact state.

In the vehicle attaching spot, the wire harness 9 is firstly attached to the object 39 (a structure body) of the vehicle to which the wire harness is attached from the long part corresponding to the under-floor 11 of the vehicle (the part having the above-described longest straight tube part 28). In the wire harness 9, since the longest straight tube part 28 of the sheath member 23 is arranged in the long part corresponding to the under-floor 11 of the vehicle, the wire harness 9 is attached under a state that the bending is suppressed. At this time, the wire harness 9 is attached with a good working property. After the long part corresponding to the under-floor 11 of the vehicle is fixed by the clamp C or the like, while the parts of the flexible tube parts 27 in the sheath member 23 are bent, remaining parts are attached. A series of works relating to the attachment are finished, the wire harness 9 is arranged in a desired path.

<Advantages of the Present Invention>

As described above by referring to FIG. 1A to FIG. 4, in the wire harness 9 of the present invention, the sheath member 23 is configured in such a form that is divided into apart under a state in which the inner surface comes into contact with the outer surface of the electrically conductive path with a clearance along a circumferential direction (a part in which a "minimum clearance S as necessary as possible" is generated and to a part under a state in which the inner surface comes into contact with the outer surface of the electrically conductive path 22 substantially without a clearance (a part of "no clearance"). Accordingly, in the part provided with the clearance, a bending function of the wire harness 9 can be effectively ensured. On the other hand, in the part which comes into contact with the outer surface of the electrically conductive path substantially without the clearance, since the wire harness 9 is compact, a miniaturization can be achieved, a weight can be reduced and a cost can be lowered effectively. In addition thereto, in the part which comes into contact with the outer surface of the electrically conductive path substantially without the clearance, a vibration of the electrically conductive path 22 can be effectively suppressed in the sheath member 23 to prevent the damage of the electrically conductive path.

Further, the manufacturing method of the present invention relates to a manufacturing method in which the extruded resin material 30 is extruded and the two electrically conductive paths are supplied to the internal space of the extruded resin material 30 together with the extrusion. Further, according to the manufacturing method, in the die 38, the outer surface of the extruded resin material 30 is formed to the outer configuration of the sheath member 23 and the inner surface of the extruded resin material 30 is allowed to meet a position corresponding to the outer surface of the electrically conductive path 22. Accordingly, the electrically conductive paths do not need to be inserted afterward as in the usual example. Thus, a minimum internal space may be sufficiently ensured as necessary as possible. As a result, the sheath member 23 which accommodates therein and protects the two electrically conductive paths 22 can be made to be compact. Therefore, when the manufacturing method of the present invention is used, the sheath member 23 can be miniaturized, the weight can be reduced, the cost can be lowered and an operation can be simplified effectively. Further, the vibration of the two electrically conductive paths 22 can be also effectively suppressed in the sheath member 23 to prevent the damage of the electrically conductive paths.

It is to be understood that the present invention may be variously changed and embodied within a range which does not change the gist of the present invention.

DESCRIPTION OF REFERENCE NUMERALS AND SIGNS

1 hybrid motor vehicle, 2 engine, 3 motor unit, 4 inverter unit, 5 battery, 6 engine room, 7 rear part of motor vehicle 8,9 wire harness, 10 intermediate part, 11 under-floor of vehicle, 12 junction block, 13 harness terminal, 14 . . . shield connector, 15 wire harness, 16 low voltage battery, 17 front part of motor vehicle, 18 auxiliary device, 19 harness main body, 20 connector, 21 harness main body, 22 electrically conductive path, 23 sheath member (resin molded product), 24 conductor, 25 insulator, 26 braided part, 27 flexible tube part, 28 straight tube part, 29 manufacturing device, 30 extruded resin material, 31 resin extruding machine, 32 electrically conductive path supply machine, 33 molding part, 34 extruding machine main, 37 molding structure part, 38 die, 39 object to which wire harness is attached

What is claimed is:

1. A wire harness comprising:
   one or more electrically conductive paths; and
   a resin molded product having a tubular shape which accommodates and protects the one or more electrically conductive paths, wherein
   the resin molded product includes a first part having clearances along a circumferential direction in substantially whole circumference between an inner surface of the resin molded product and outer surfaces of the one or more electrically conductive paths and a second part having substantially no clearance between the inner surface of the resin molded product and an outer surface of one of the one or more electrically conductive paths in an area along the circumferential direction, and
   each of the first part and the second part of the resin molded product includes an exposed outer surface.

2. The wire harness according to claim 1, wherein the first part and the second part are alternatively arranged.

3. A manufacturing method of a wire harness including one or more electrically conductive paths and a resin molded product having a tubular shape which accommodates and protects the one or more electrically conductive paths, the manufacturing method comprising:
   extruding straight an extruded resin material having an internal space to a die from a resin extruding machine and supplying straight the one or more electrically conductive paths toward the internal space together with the extrusion;

forming the extruded resin material as a first part and a second part such that the first part includes an inner surface that is spaced away from the one or more conductive paths and the second part has an inner surface that contacts the one or more conductive paths aligning an inner surface of the extruded resin material corresponding to outer surfaces of the one or more electrically conductive paths.

\* \* \* \* \*